United States Patent [19]
Songer et al.

[11] 3,793,656
[45] Feb. 26, 1974

[54] WHEEL WEIGHT TOOL
[75] Inventors: Hubert D. Songer; Warren E. Carter, both of Murfreesboro, Tenn.
[73] Assignee: Perfect Equipment Corporation, Murfreesboro, Tenn.
[22] Filed: Sept. 7, 1971
[21] Appl. No.: 177,958

[52] U.S. Cl............................ 7/8, 254/131, 29/267
[51] Int. Cl........................... B25f 1/00, B23p 19/04
[58] Field of Search............... 7/8, 9, 1 E, 8.1 R, 12; 254/131; 29/267, 283, 245

[56] References Cited
UNITED STATES PATENTS

| | | | |
|---|---|---|---|
| 2,274,126 | 2/1942 | Carrigan | 254/131 |
| 2,314,145 | 3/1943 | Kalajian | 254/131 |
| 2,883,153 | 4/1959 | Abbott | 254/131 |
| 3,152,391 | 10/1964 | Bjorn et al. | 254/131 X |

*Primary Examiner*—Harold D. Whitehead
*Assistant Examiner*—Roscoe V. Parker
*Attorney, Agent, or Firm*—Paul M. Denk

[57] ABSTRACT

A tool for removing and installing wheel weights is provided designed to permit utilization of the tool in a variety of situations including use where the tire and wheel are mounted on an axle of a vehicle. The components of the tool are mounted on a handle and the tool is constructed so that those components are replaceable whenever normal wear or breakage destroys their effectiveness. The tool has a prying means and a spanner removably mounted on one end of an elongated handle portion. The prying means and spanner are adapted to remove wheel weights quickly and effectively in one motion of the tool.

6 Claims, 7 Drawing Figures

INVENTORS:
WARREN E. CARTER
HUBERT D. SONGER

PATENTED FEB 26 1974 3,793,656

INVENTORS:
WARREN E. CARTER
HUBERT D. SONGER
BY: Lionel S. Lunders

WHEEL WEIGHT TOOL

BACKGROUND OF THE INVENTION

This invention relates to hand tools and in particular to a tool adapted to remove wheel weights.

Tire care has become an integral part of vehicle maintenance. All types of wheeled vehicles perform better when their wheels are aligned, and their wheels and tires are balanced. Balancing improves tire wear and prevents wheel vibrations at higher speed.

Wheel balancing itself is relatively simple. It is common to place the rim and inflated tire on a fulcrum and proceed to balance the wheel by distributing weights around the tire rim. Some form of level may be utilized as an aid in balancing. Once positioned properly, the weights are attached to the wheel rim. Other balancing methods include one where the tire remains mounted on the vehicle during balancing. In this method, wheel rotation is observed and the weights positioned so that wheel vibration is eliminated.

Regardless of the balancing method utilized, the wheel weight itself commonly consists of a relatively heavy, cast lead weight portion and an arcuate attaching part. The heavy weight portion generally is designed to fit into a groove in the tire rim and the arcuate attaching part is designed to overlap and lock onto the rim. The arcuate attaching part usually has an opening through it which is used during weight removal.

It is common practice to balance wheels whenever new tires are mounted on the rims, or whenever a tire is rotated from one axle position to another. During these balancing operations, it becomes necessary to remove old wheel weights, substituting new, repositioned ones. The opening in the arcuate attaching part of the weight is utilized for weight removal. Some type of tool is inserted into the opening and the weight is literally pried from the rim and discarded.

The prior art reveals several tools for removing unwanted wheel weights. Even a common screwdriver may be utilized in some instances. Generally, however, these prior art efforts exhibit deficiencies which have limited their wide commercial acceptance. Thus, while a screwdriver may be utilized for weight removal, its use is inefficient and time consuming. Other special tools have been developed for weight removal. Conventionally, their working end and handle are constructed integrally and continued use make them highly susceptible to wear, which in turn limits the useful life of the tool.

Our invention eliminates these prior art deficiencies. The tool of our invention is designed for efficient wheel weight removal in a variety of wheel mounting situations. Wheel weight removal is accomplished through replaceable elements the combination of which form the functional end of our hand tool.

One of the objects of this invention is to provide a low cost hand tool for removing wheel weights.

Another object of this invention is to provide a hand tool for removing wheel weights having replaceable components, thereby providing a long tool life.

Another object of this invention is to provide a hand tool for removing wheel weights which is effective regardless of whether the tire and rim are mounted or unmounted on a vehicle.

Still another object of this invention is to provide a hand tool for removing wheel weights which includes, and incorporates in the working end of the tool, means for attaching wheel weights.

Yet another object of this invention is to provide a tool useful in removing wheel covers.

Other objects will become apparent to those skilled in the art in light of the following description and accompanying drawings.

SUMMARY OF THE INVENTION

In accordance with this invention, generally stated, a tool for removing wheel weights is provided having an elongated portion adapted to provide a handle at one end and another working end. The working end includes a pair of wheel weight removing implements designed for quick and effective wheel weight removal regardless of the axle mounted-unmounted condition of wheel and tire. The wheel weight removing implements are themselves removably mounted to the tool working end and may be replaced when necessary.

In the preferred embodiment, the tool of this invention has a working end composition of three components removably mounted to one another and to the handle of the tool.

DESCRIPTION OF THE PREFERRED EMBODIMENT

Figure 1:
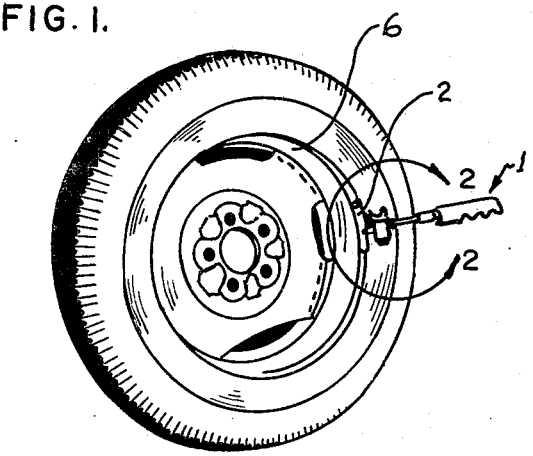
FIG. 1 is a view in perspective illustrating a first use of tool of this invention.
Figure 2:
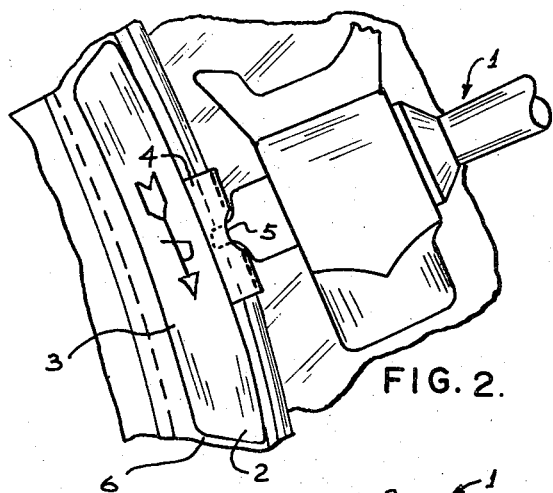
FIG. 2 is an enlarged sectional view, partly broken away, taken along the line 2—2 of FIG. 1.

Referring now to FIG. 1, reference numeral 1 indicates one illustrative embodiment of wheel weight tool of this invention. Tool 1 is intended to be used with a wheel weight 2. Weight 2 is conventional and includes a heavy, weight portion 3 and an arcuate attaching part 4. Part 4 conventionally has an opening 5 in it, the use of which is described in detail hereinafter. Weight portion 3 conventionally conforms to the shape of a wheel rim 6. Attaching part 4 is designed to overlap a flange portion 7 of the wheel rim 6 and holds the weight to the rim after being forced to abut the flange. Weight 2 may be constructed from any suitable material. It is common to use cast lead for the construction of the weight.

Figure 6:
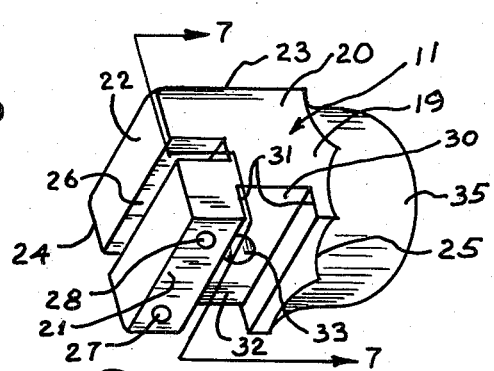
FIG. 6 is an enlarged and exploded view of the device illustrated in FIG. 1.
Figure 6:
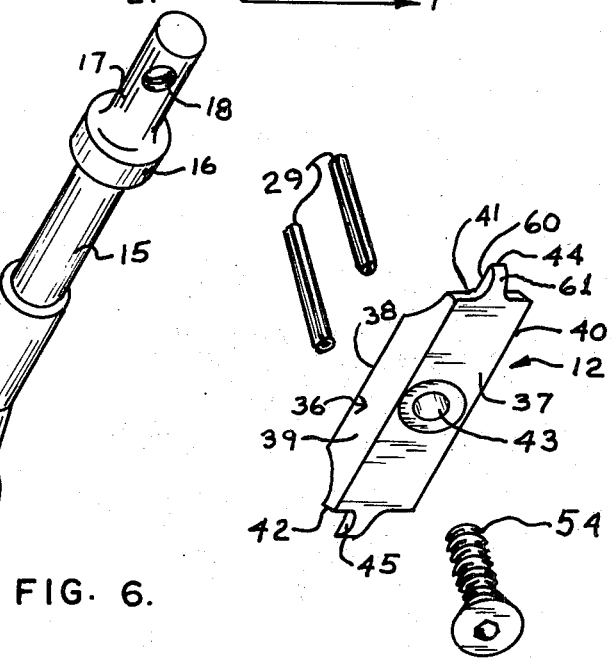

Tool 1 includes an elongated handle portion 8 having a grip end 9 and a working end 10. As is best seen in FIG. 6, working end 10 is a composition of parts, including a hammer 11, a prying means 12 and a spanner 13.

End 9 of handle portion 8 is conventional. In the embodiment illustrated, it is fitted with a hand grip 14, similar to a conventional bicycle bar grip which is adapted to conform to the hand of the intended user. A shaft arm part 15 comprises the remainder of the handle 8. The design of arm 15 may vary in other embodiments of our invention. In the embodiment illustrated, however, arm 15 terminates at a lip 16 which extends radially outwardly from arm 15. A pintle 17 extends axially upwardly from the lip 16. Pintle 17 has a threaded opening 18 in it, the purpose of which is described in detail hereinafter.

Hammer 11 includes a rectangular base structure 19 having sides 20, 21, 22, 23, 24 and 25. Side 22 has a narrow groove 26 in it, running the length of side 22 and opening onto and through the sides 20 and 24 of base 19. Sides 23 and 21 have openings 27 and 28 running through them, which open into the groove 26. Openings 27 and 28 are fitted with a pair of pins 29 which are secured to base 19 by any convenient method, such as press fits, for example. While the length of the pins 29 may vary, they must be long enough to bridge groove 26. The placement of pins 29 is important as the pins are utilized for mounting the spanner 13. Pins 29 are conventional and in the embodiment illustrated comprise open ended split tubular sections.

Figure 7:
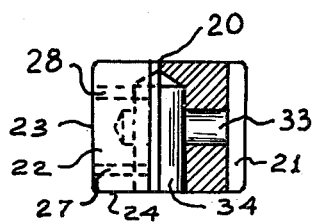
FIG. 7 is a sectional view taken along the line 7—7 of FIG. 6.

Side 21 has a rectangular channel 30 in it, running the length of side 21 and opening onto and through the sides 20 and 24. Channel 30 has a pair of side walls 31 and a bottom wall 32. Bottom wall 32 has an opening 33 in it. Side 24 also has an opening 34 in it, designed to accept pintle 17 of handle 8 to a depth of the lip 16. The openings 33 and 34 meet within the material thickness of base 19, at substantially right angles to one another, as is best illustrated in FIG. 7. The depth of opening 34 is chosen to allow alignment of the opening 18 in pintle 17 wiht opening 33. Opening 33 extends beyond the diametric size of opening 34 within the body of hammer 11.

In the preferred embodiment illustrated, the side 25 of base structure 19 is formed to provide an integrally constructed, solid cylindrical section 35. Section 35 provides the functional equivalent of a conventional hammer head. Section 35 allows the tool of this invention to be utilized in attaching the wheel weight 2 to the rim 6. Weight 2 is positioned quickly by striking attaching part 4 along section 35 with a sharp hammer blow. Those skilled in the art, however, recognize that other embodiments of the tool of our invention may be provided without section 35, and those embodiments retain the other desirable attributes described herein.

Prying means 12 is a rectangular body 36 having a front 37, a back 38, sides 39 and 40, and edges 41 and 42. Back 38 is approximately equal in length to side 21; the depth of sides 39 and 40 is substantially equal to the depth of the channel 30; and the width of the back 38 and the front 37 is chosen so that the prying means 12 mates with the channel 30 in a loose friction fit. The front 37 and back 38 have an opening 43 from and through them. Opening 43 aligns with opening 33 in the channel 30. When so aligned, the edges 41 and 42 extend above the sides 20 and 24 respectively. Front 37 is counter sunk about the opening 43. Opening 43 is designed to receive a conventional screw 54. The edges 41 and 42 are formed into picks 44 and 45 respectively. Picks 44 and 45 are identical. Each has an esentially flat side 60 and a second, convex side 61.

Spanner 13 is a C-shaped body having a base area 46 integrally formed along the curved spine of the C-shape. The C defines a hook 47 and a support area 48. Base 46 has a pair of notches 49 and 50 in it. Spanner 13 is mounted to hammer 11 by inserting the base 46 into the groove 26 and engaging the pins 29 in notches 49 and 50.

As thus described, working end 10 comprises a three-component system the components of which are replaceable after normal wear destroys their effectiveness. Construction of the device of this invention is simple. Pins 29 are press fit into the openings 27 and 28. As previously described, the pins 29 must bridge notch 26.

Spanner 13 is then interlocked with the pin 29 along the notches 49 and 50. Pintle 17 of handle 8 is inserted into the opening 34, and the openings 18 and 33 are aligned. It should be noted that lip 16 blocks groove 26 along the side 24 upon full insertion of the pintle 17 in opening 34. Consequently, spanner 13 effectively is locked into position.

Prying means 12 is inserted in channel 30 and screw 54 is engaged through the openings 43, 33, 18 and secured to hammer 11 within base structure 19. Use of the counter sunk area around the opening 43 permits flush mounting of the screw 54 giving the tool of this invention a streamline appearance. Screw 44 thus locks prying means 12 to hammer 11 and the three component working end 10 to the handle 8 to form a unitary implement.

Use of the tool 1 is demonstrated in FIGS. 1–4. Prying means 12 serves a dual function. Besides its wheel weight function, it also is useful where the wheel has a wheel cover attached to it. Thus, insertion of pick 44 between the rim 6 and the wheel cover permits the tool 1 to be used lever fashion to remove the cover.

Prying means 12 is designed for use where the vehicle wheels are balanced while mounted on the vehicle proper. Heretofore it has been practically impossible to remove a previously installed wheel weight which has been mounted on the inside of the rim 6, a situation corresponding to the illustration of FIG. 1. Prior art tool use was precluded due to interference with various vehicle components unrelated to the balancing function. For example, shock absorbers, brake lines or brake hoses, springs, spring mounts, shock mounts and similar obstructions have all caused interference. Prying means 12, however, can be used in these situations to effectively remove the wheel weight. Pick 44 is inserted into opening 5 of the wheel weight 2. Edge 61 of pick 44 will rest against the tire, thus affording a pivot point for pulling the weight from the wheel. Prying means 12 may be rotated whenever the picks 44 and 45 are worn. Thereafter, prying means 12 is replaced.

Figure 4:
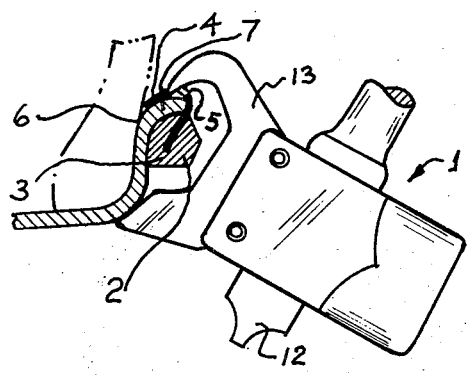
FIG. 4 is an enlarged sectional view taken along the line 4—4 of FIG. 3.
Figure 3:
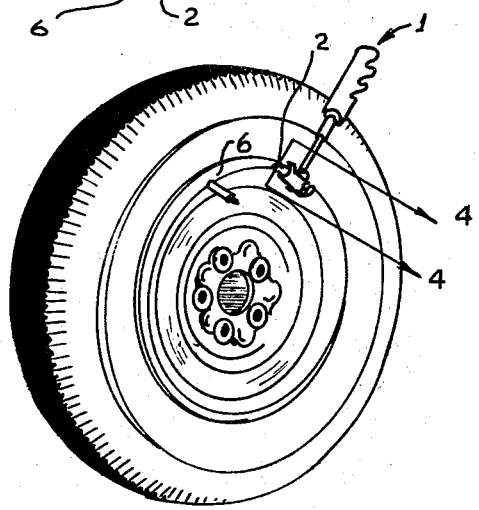
FIG. 3 is a view in perspective illustrating a second use of tool of this invention.
Figure 5:
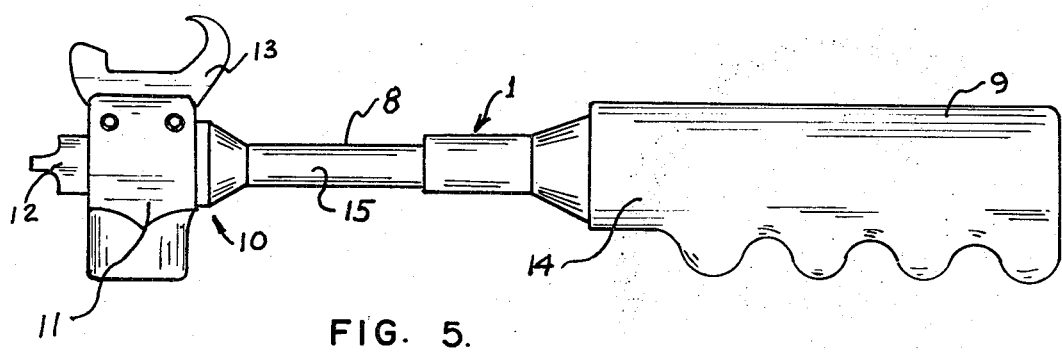
FIG. 5 is a plan view of the tool illustrated in FIG. 1.

The spanner 13 is utilized for weight removal, among other instances, in the common situation where the tire and its associated rim, have been removed from the vehicle axle. Hook 47 is inserted within the opening 5 and the spanner 13 is designed to allow support area 48 to rest against the tire rim 6, as is illustrated in FIG. 4. Clockwise rotation of the handle 8, as viewed in FIG. 4, pries the weight 2 from the rim 6. The spanner 13, of course, is useful in other weight removal situations including the wheel-axle mounted setting described previously, for example.

Numerous variations, within the scope of the appended claims, will occur to those skilled in the art in light of the foregoing description and accompanying drawings. Thus, the shape or configuration of the handle portion 8 may be varied, or the working end 10 may be constructed without utilizing cylindrical section 35. That is, the tool of this invention is extremely useful even when the hammer function is omitted. The picks 44 and 45 are useful in removing wheel weights even where the opening 5 is inaccessible or where the wheel weight is constructed without such an opening. Thus, the pick may be inserted between the rim 6 and the weight 2, or between the tire proper and the weight 2, and may be utilized literally to pry the weight away. The design of picks 44 and 45 may be varied. For example, the length, width or shape of the picks are alterable. Likewise, design of the spanner 13 may be varied. Various materials may be used in the construction of our invention. While the preferred embodiment is steel, other materials, or combinations of materials may be used. Thus, the handle portion may be aluminum and the working end steel, for example. These variations are merely illustrative.

Having thus described the invention, what is claimed and desired to be secured by letters patent is:

1. A tool for installing and removing wheel weights comprising in combination a handle having a gripping end and a second end, a hammer head removably mounted to said second end, said hammer head comprising at least a first side functioning as a hammering surface as for use for installing wheel weights, a second side, and a third side, said second and third sides each having a opening extending one length dimension of the respective sides, a C-shaped spanner removably mounted in the opening in one of said second and third sides, said spanner for use in removing wheel weights, mounting means retaining said spanner to said head, a second means for removing wheel weights being removably mounted proximate the other of said sides, said means comprising a generally rectangularly shaped structure narrowing on at least one end to form a pick like appendage, said structure being mounted in the other opening of said second and third sides, and securing means retaining said rectangularly shaped structure to said head.

2. The invention of claims 1 wherein said hammer head includes an opening extending at least partially therethrough, the second end of said handle formed integrally into a pintle, said pintle being inserted into said head opening to mount the head thereon, and a fastening means securing the head to said handle end.

3. The invention of claim 2 and including said handle formed having a lip proximate the location where said pintle integrally connects to the handle end, said lip limiting the extent of insertion of said pintle into the hammer head opening.

4. The invention of claims 1 wherein said spanner includes at least one notch formed therein, a pin means arranged through the hammer head and across the opening into which the spanner inserts and engaging within said spanner notch to retain the same to said hammer head.

5. The invention of claim 4 wherein said handle is formed having a lip at the location where said second end mounts to the hammer head, said lip preventing a shifting of the spanner during its retention within the hammer head opening into which it mounts.

6. A tool for installing and removing wheel weights comprising in combination a handle having a gripping end and a second end, a hammer head removably mounted to said second end, said hammer head comprising at least a first side functioning as a hammering surface as for use for installing wheel weights, a second side, said second side having an opening extending one length dimension of the respective side, a C-shaped spanner removable mounted in the opening in said second side, said spanner for use in removing wheel weights, and mounting means retaining said spanner to said head.

* * * * *